May 29, 1956  C. N. SMYTH  2,748,369
TRANSDUCER
Filed Dec. 7, 1951
FIG.1.
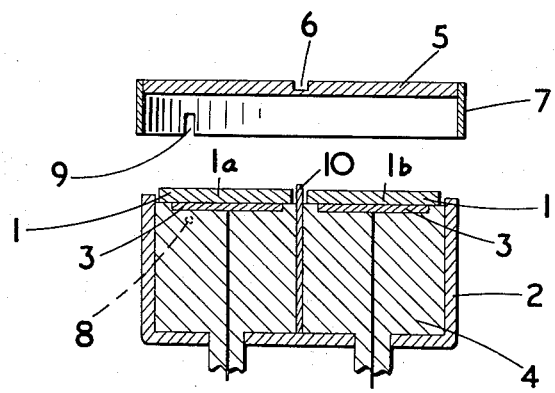
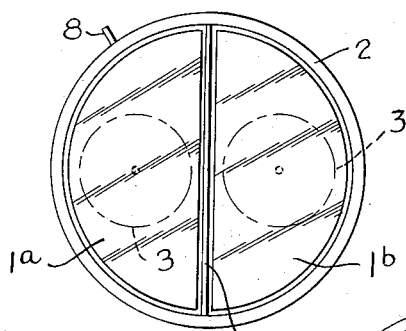
FIG.2.
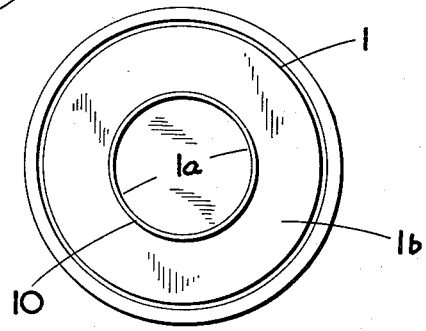
FIG.3
INVENTOR
Charles Norman Smyth
BY
ATTORNEYS United States Patent Office 2,748,369
Patented May 29, 1956

2,748,369

TRANSDUCER

Charles Norman Smyth, London, England, assignor to The Birmingham Small Arms Co. Limited, Birmingham, England, a British company Application December 7, 1951, Serial No. 260,529

5 Claims. (Cl. 340—10)

This invention is concerned with improvements in or relating to sound-wave-ranging apparatus.

A sound-wave-ranging apparatus usually transmits discrete sound pulses through water or other media, and receives any echoes which may be derived from reflection of the pulses when they are incident upon a suitable reflecting surface. In order to effect this operation, the apparatus includes a high-voltage generating unit which is adapted to send pulses of current through an electromechanical device of such a nature that the pulses of current are converted into sound pulses. The sound pulses are then transmitted through matter. Conveniently, the electromechanical device may be one which has a magnetostrictive nature, that is to say, its dimensions change when it is located in a varying magnetic field, but, on the other hand, it may merely be a piezo-electric crystal such as quartz, barium titanate, or Rochelle salt.

There is also included in the apparatus a similar electromechanical device for receiving any reflected sound pulse. A reflected sound pulse received by the device is converted to an electrical oscillation which is fed to an amplifier so that it may be used for indicating or recording purposes.

Under certain operating conditions it is advantageous to utilize in the equipment only one electromechanical device having on one of its faces a single electrode connected not only to the pulse generator but also to the receiver amplifier. The device then not only serves to transmit the sound pulses but also serves to receive the reflected pulses. Unfortunately, however, the use of a common electromechanical device for the two functions imposes limitations on the design of the receiver and on the wave shape of the transmitted pulses.

Each transmitted pulse must be of very short duration in order to ensure that it is completely over before the first reflected pulse is received by the electromechanical device since otherwise the reflected pulse, having a magnitude diminished in comparison with that of the original pulse would not be detectable. Furthermore, the amplifier, being connected to the device, would normally be paralyzed by the magnitude of the transmitted pulse and would take time to recover to its full sensitivity. It is possible, of course, to take precautions which will tend to overcome these disadvantages but there is then a likelihood of the performance of the apparatus being affected in other ways such as, for example, by a decrease in the signal-to-noise ratio of the amplifier.

It is one of the objects of this invention to provide an improved electromechanical device for use in a sound-wave-ranging apparatus.

According to the present invention an electromechanical device suitable for use in a sound-wave-ranging apparatus comprises a piezo-electric crystal which is divided into sections, one section having upon one of its faces at least one electrode connected to a pulse generator and the other section having at least one electrode connected to the receiver amplifier, another face of the first section of the crystal being used for transmitting an interrogating pulse through a medium which is under investigation.

According to a feature of the present invention the electrodes are adapted not only to act as electrical connections but also to cause comparatively rapid decay of crystal vibrations.

According to yet another feature of the invention there is additionally provided between the crystal sections mentioned in the preceding paragraph a grounded screening electrode.

According to yet another feature of the invention any intercoupling between transmitting electrode and receiving electrode is minimized by vibrationally separating the crystal into a transmitting section and a receiving section.

The invention will now be more particularly described with reference to the accompanying drawings illustrating two forms of the invention and in which similar references denote corresponding parts.

Fig. 1 is a sectional view of one form of the device with the diaphragm detached.

Fig. 2 is a top plan view of the crystal sections and cap as shown in Fig. 1.

Fig. 3 is a top plan view of a modification of the device.

Figure 1 illustrates a circular crystal 1 diametrically divided into two sections 1a, 1b which are therefore each of D-shape. The crystal is disposed at the open end of a grounded metal cup 2 and a screening electrode 10 is disposed between the sections and is connected to the cup. Plate-like electrodes 3 are held against the inner faces of the respective crystal sections by an elastic plastic material 4 such as polyvinyl chloride, and one electrode may be connected to the pulse generator for transmission of sound pulses by one of the crystal sections whilst the other may be connected to the receiver amplifier to amplify sound pulses reflected from an object and received by the other crystal section. A circular diaphragm 5 is diametrically grooved at 6 and may be secured against or adjacent the crystal sections by a band clip 7 located by engagement of a pin 8 which engages a slot 9.

The purpose of the groove 6 is to separate the diaphragm 5 into two halves which overlie the respective crystal sections and thereby substantially prevent ranging-waves passing from the transmitter to the receiver except by way of the medium under investigation.

In Figure 2 the crystal 1 is circular and is vibrationally separated by dividing it so as to form a central disc 1a and a surrounding annulus 1b, the distance between the two being of the order of 0.005 inch. With such a crystal one side of the central disc may be connected to the pulse generator (so that the other side of the disc may transmit an interrogating pulse) and the corresponding side of the annulus will be connected to the receiver amplifier.

Conveniently the electrodes are either evaporated or sputtered onto the surface. Since the usual electrode metals do not continue to vibrate for a prolonged period after energization thereof has ceased, as compared with a piezo-electric crystal such as quartz, the application of the electrodes to the crystal sections causes the vibration thereof to decay or die away, the energy of the crystal sections being absorbed and dissipated by the electrodes.

Having thus described my invention, what I claim as new and desire to secure by Letters Patent is:

1. An electromechanical device suitable for use in sound-wave-ranging apparatus consisting of two juxtaposed sections of a piezo-electric crystal slab which is cut into two sections and mounted side by side in a common housing, one of said crystal sections having upon one of its faces at least one electrode connected to a pulse generator and the other crystal section having at least one electrode connected to the receiver amplifier, the other face of the crystal section connected to the said pulse generator being operative to transmit an interrogating pulse through a medium which is under investigation.

2. An electromechanical device according to claim 1 wherein the crystal is vibrationally separated into independent transmitting and receiving sections.

3. An electromechanical device according to claim 1 wherein the crystal is circular and is vibrationally divided to provide a central disc and a surrounding annulus.

4. An electromechanical device suitable for use in sound-wave-ranging apparatus consisting of a metallic grounded cup having an open end, two juxtaposed sections of a piezo-electric crystal slab cut into two sections and mounted side by side at the open end of said cup, one of said crystal sections having upon one of its faces a plate-like electrode connected to a pulse generator and the other crystal section having a plate-like electrode connected to the receiver amplifier, the other face of the crystal section connected to said pulse generator being operative to transmit an interrogating pulse through a medium which is under investigation, a body of elastic plastic material within the cup and holding said electrodes against the inner faces of the respective crystal sections, and a screening electrode connected to the cup and interposed between the crystal sections.

5. An electromechanical device according to claim 4 wherein a diaphragm is secured against or adjacent the crystal sections and is grooved to provide two connected sections corresponding to the two crystal sections.

References Cited in the file of this patent

UNITED STATES PATENTS

| | | |
|---|---|---|
| 2,269,403 | Williams | Jan. 6, 1942 |
| 2,386,279 | Tibbets | Oct. 9, 1945 |
| 2,434,143 | Chilowsky | Jan. 6, 1948 |
| 2,505,364 | McSkimin | Apr. 25, 1950 |